Feb. 26, 1929.

R. F. POWER

PERMANENT BINDER

Filed June 20, 1927  4 Sheets-Sheet 1

R. F. Power
INVENTOR

By Marks & Clerk
ATTYS.

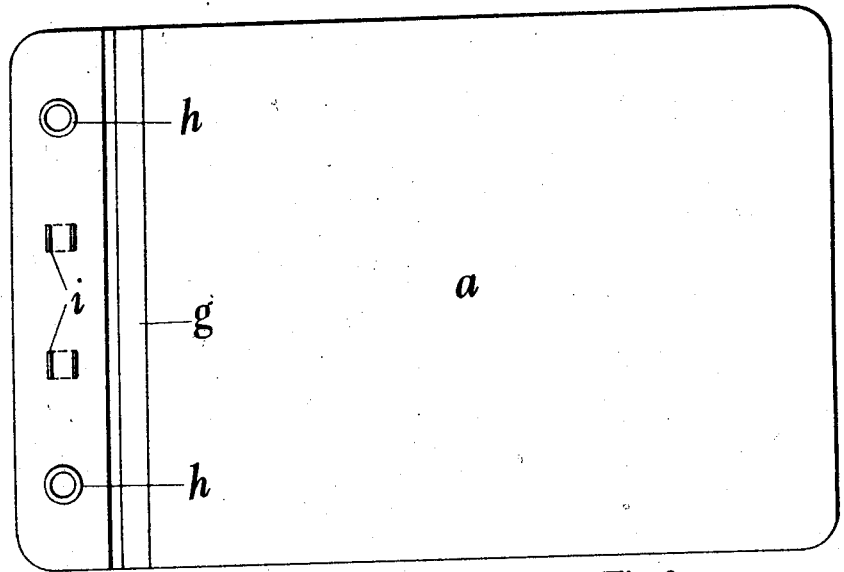
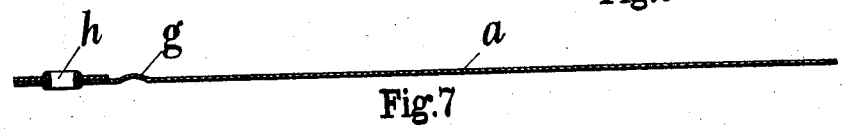
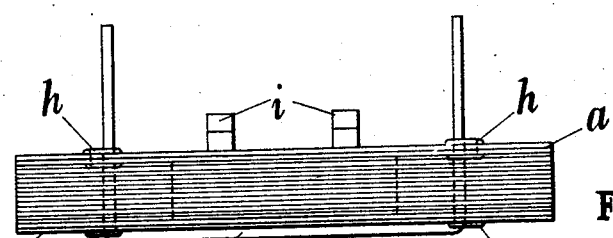
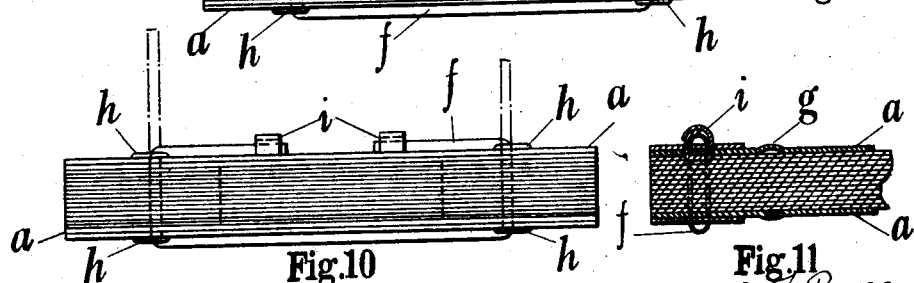

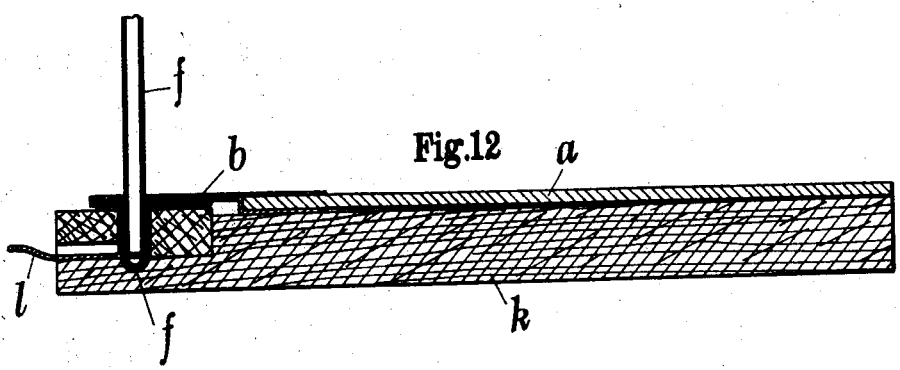
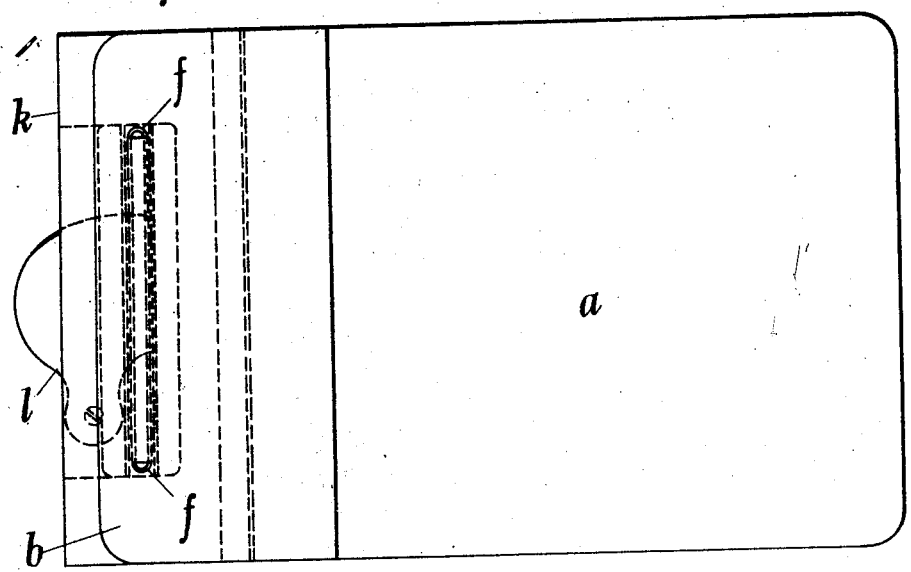
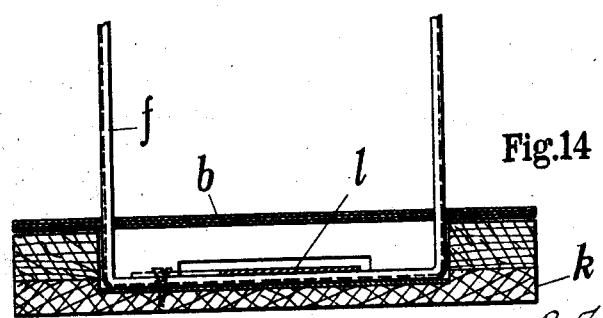

Feb. 26, 1929.  R. F. POWER  1,703,245
PERMANENT BINDER
Filed June 20, 1927   4 Sheets-Sheet 4
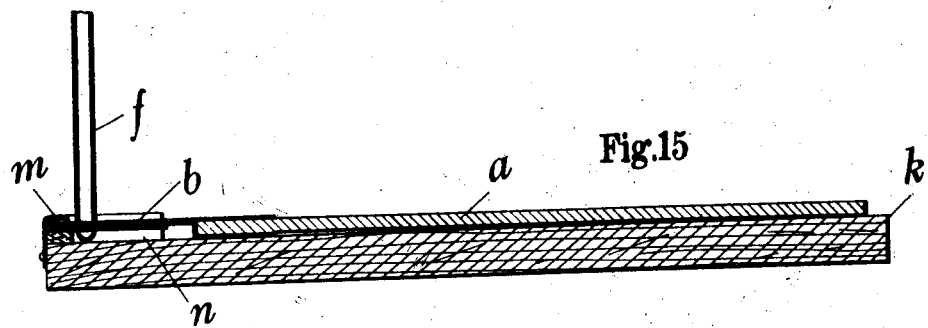
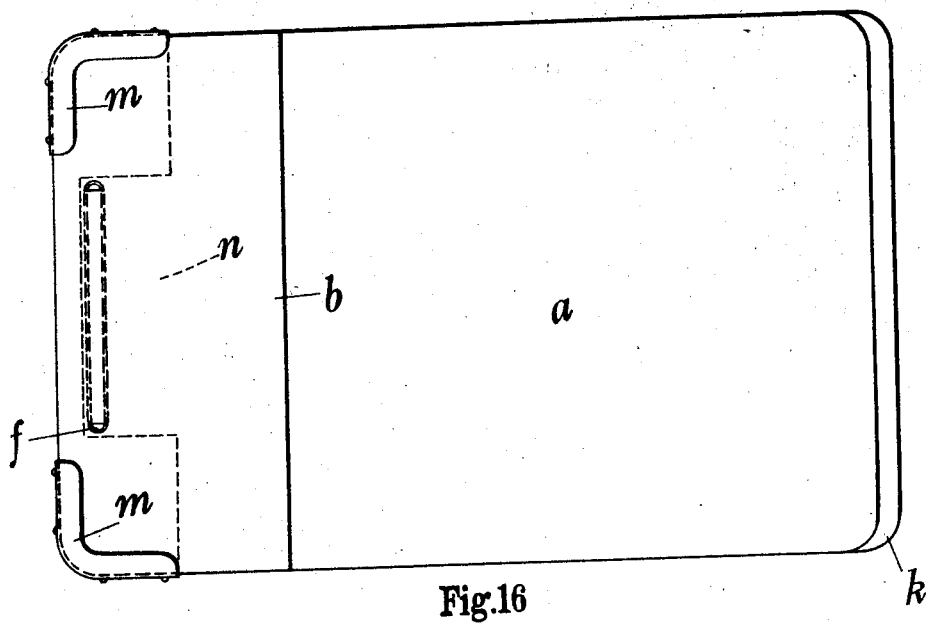
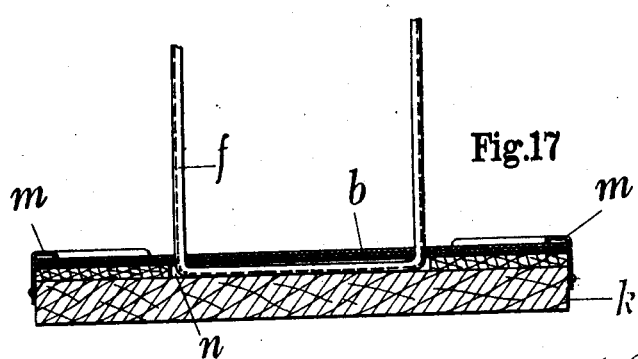

Patented Feb. 26, 1929.

1,703,245

UNITED STATES PATENT OFFICE.

RICHARD FITZ POWER, OF LONDON, ENGLAND, ASSIGNOR TO MORLAND & IMPEY LIMITED, OF BIRMINGHAM, ENGLAND.

PERMANENT BINDER.

Application filed June 20, 1927, Serial No. 200,200, and in Great Britain July 26, 1926.

After a number of leaves have been used in a temporary binder, it is sometimes required to bind them permanently in a binder of inexpensive form. Various forms of permanent binders for this purpose are known, in which a metal binding wire or strip is inserted through a pair of covers and the leaves.

The object of the present invention is to provide an improved permanent binder of simple and convenient construction and of neat appearance.

The invention comprises primarily the use of a metal binding strip of concavo-convex section. Such a strip is capable of being easily bent, and when bent it forms a sharp angle.

The invention preferably also comprises the combination with the rear edge of each cover, of a clamping strip of metal or other suitable material which is formed with slots having a form similar to the cross section of the binding strip.

Also the invention may comprise the combination with one of the covers, of clips or tongue pieces for engaging the folded binding strip.

Further the invention comprises the employment in assembling the leaves, covers and binding strips of temporary supports as hereinafter described.

In the four accompanying sheets of explanatory drawings:—

Figure 6 is a plan, Figure 7 a longitudinal section, and Figure 8 a cross section of a modified form of cover.

Figures 9 and 10 are rear views showing the binding of a number of leaves between covers as shown in Figures 6–8, and Figure 11 is a longitudinal section through the rear portion of the bound covers and leaves shown in Figure 10.

Figures 12, 13 and 14 are respectively longitudinal section, plan and transverse section of a temporary holder for use in assembling the leaves and covers on the binding strip.

Figures 15, 16 and 17 are respectively similar views to Figures 12, 13 and 14, showing an alternative form of temporary support.

In carrying the invention into effect as shown in Figures 1–5, each cover comprises a cardboard portion $a$ to the rear edge of which is hinged by means of a canvas or other flexible material $b$ a metal clamping strip $c$ which is perforated at a pair of suitable positions $d$ to receive the binding strip. The flexible material which encloses the clamping strip is likewise perforated. Also two or more tongue pieces $e$ are pressed out from one of the clamping strips in suitable positions.

Figure 1:
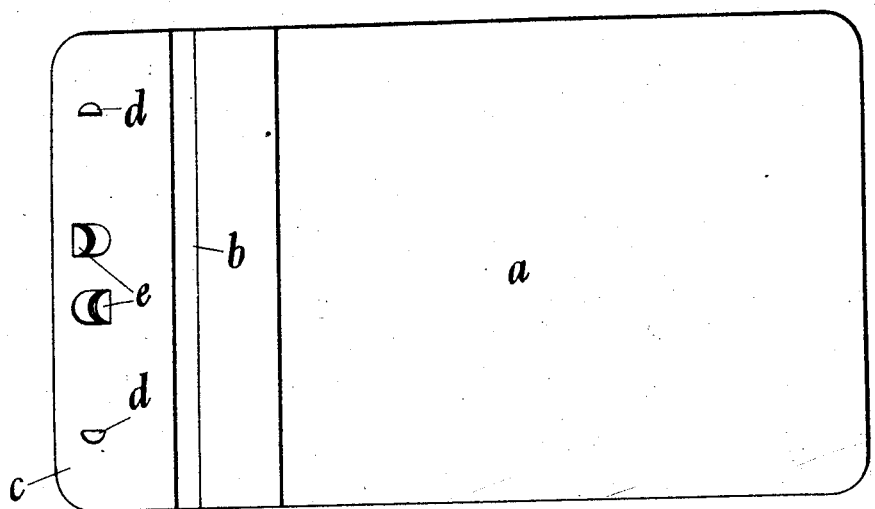
Figure 1 is a plan and Figure 2 a longitudinal section of one of a pair of covers adapted in accordance with this invention for permanently binding a number of sheets.
Figure 2:
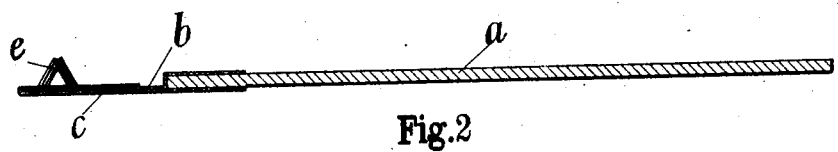
Figure 3:
Figure 3 is a side elevation and Figure 4 a cross section of the binding strip.
Figure 4:
Figure 5:
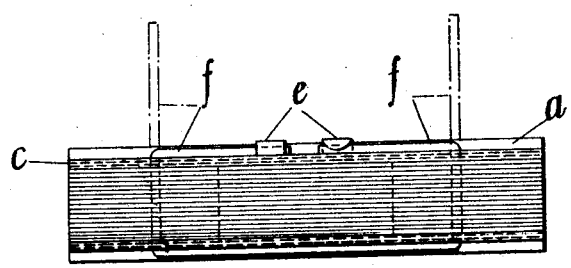
Figure 5 is a rear elevation showing the mode of binding a number of leaves by means of the strip and covers shown in Figures 1–4.

The metal binding strip $f$ which may be made from brass or soft iron or steel is formed to a hollow semi-circular or other like concavo-convex section of uniform thickness. In use the strip is first bent to permit the insertion of its ends through the slots in the clamping strips as shown in Figure 5, and also through the usual holes, slots, or other perforations in the leaves. Subsequently the projecting ends of the binding strip are bent down over the outer face of the upper clamping strip, and finally they are secured by bending over them the tongue pieces $e$ above mentioned.

By the use of a binding strip as above described I am able to obviate the disadvantages of a wire or strip of circular, flat, or solid semi-circular section, as, after the strip is bent, the corners at the bends assume a sharp angle, and the portions lying within the leaves have no tendency to assume a curved form. The use of perforations in the clamping strips of the same form as the section of the binding strip also assists me in obtaining the desired results.

Referring to Figures 6–11, each cover $a$ is made entirely from cardboard, the portion forming the rear end being adapted in any convenient manner to provide a flexible or hinge portion at $g$. Preferably a double thickness of cardboard is provided at the rear portion as shown. Eyelets $h$ are provided for the reception of the binding strip, and separate metal clips $i$ are also provided in one of the covers to secure the ends of the strip. The mode of using the covers and binding strip is essentially the same as that above described, and is fully illustrated in Figures 9, 10 and 11.

For use in assembling the leaves and covers on the strips, I may employ temporary supports of which two forms are shown in Figures 12-17.

Referring to Figures 12, 13 and 14, the temporary support comprises a base $k$ which is preferably stepped on its upper surface and adapted to accommodate the lower cover $a, b$. The part of the support beneath the cover portion $b$ is recessed to accommodate the binding strip $f$, the latter being secured to the support by a pivoted clamping piece $l$. The leaves to be bound are placed over the binding strip and when a sufficient number of leaves have been assembled, the other cover is placed in position. Before proceeding to bind the leaves and covers together, the binding strip is released from the temporary support, and after advancing the binding strip so that the horizontal portion comes into contact with the outer side of the under cover the projecting ends of the binding strip are bent over the upper cover and secured as already described. By the use of a relatively deep recess in the temporary support as shown in Figures 12-14, the vertical portions of the strip are held steady while the leaves are being assembled on the vertical portions of the strip. For some purposes this convenience may not be required, in which case the simpler form of temporary support shown in Figures 15-17 may be employed. Here the stepped portion of the support is provided with corner clamping pieces $m$ beneath which the corners of the portion $b$ of the lower cover may be slipped, and the stepped portion is also gapped at $n$ to accommodate the horizontal portion of the binding strip. Whilst the binding strip is not held so rigidly in this construction as in the one shown in Figures 12-14, the strip and lower cover are nevertheless held sufficiently firmly for many temporary uses.

Having thus described my invention what I claim as new and desire to secure by Letters Patent is:—

1. In loose leaf binders, the combination comprising a metal binding strip which throughout its length is of concavo-convex section, and a pair of clamping plates each provided with slots having a form similar to the cross section of the binding strip, substantially as described.

2. The combination with a loose-leaf binder, of a metallic binding strip having an initial concavo-convex section throughout its entire length and adapted to be bent to form a relatively sharp corner.

In testimony whereof I have signed my name to this specification.

RICHARD FITZ POWER.